US010174673B2

(12) United States Patent
Chen

(10) Patent No.: US 10,174,673 B2
(45) Date of Patent: Jan. 8, 2019

(54) PORTABLE GREEN POWER SYSTEMS

(71) Applicant: DYC Turbines, LLC, San Diego, CA (US)

(72) Inventor: Daih-Yeou Chen, San Diego, CA (US)

(73) Assignee: DYC TURBINES, LLC, San Diego, CA (US)

( * ) Notice: Subject to any disclaimer, the term of this patent is extended or adjusted under 35 U.S.C. 154(b) by 557 days.

(21) Appl. No.: 14/741,999

(22) Filed: Jun. 17, 2015

(65) Prior Publication Data

US 2016/0369647 A1   Dec. 22, 2016

(51) Int. Cl.
| | |
|---|---|
| *F02C 3/05* | (2006.01) |
| *F02C 7/10* | (2006.01) |
| *F02C 7/08* | (2006.01) |
| *F02C 3/14* | (2006.01) |

(52) U.S. Cl.
CPC ............... *F02C 3/05* (2013.01); *F02C 3/145* (2013.01); *F02C 7/08* (2013.01); *F02C 7/10* (2013.01); *F05D 2240/52* (2013.01); *F05D 2240/54* (2013.01); *F05D 2250/80* (2013.01)

(58) Field of Classification Search
CPC ...... F02C 7/08; F02C 7/10; F02C 3/05; F02C 3/145; F05D 2240/52; F05D 2240/54; F05D 2250/80
See application file for complete search history.

(56) References Cited

U.S. PATENT DOCUMENTS

| | | | | |
|---|---|---|---|---|
| 3,222,864 A * | 12/1965 | Dyste | ......................... | F02C 7/08 60/39.511 |
| 3,424,240 A * | 1/1969 | Stein | ......................... | F02C 7/08 165/166 |
| 4,180,973 A * | 1/1980 | Forster | ...................... | F02C 7/08 165/905 |
| 4,974,413 A * | 12/1990 | Szego | ....................... | F02C 7/08 165/166 |
| 6,832,470 B2 * | 12/2004 | Dewis | ....................... | F02C 7/10 60/39.511 |
| 2010/0176592 A1 * | 7/2010 | Artes De Arcos Marco | ............... | F02C 7/10 290/2 |

* cited by examiner

*Primary Examiner* — Mary A Davis
(74) *Attorney, Agent, or Firm* — Steven R. Vosen

(57) ABSTRACT

A portable green power system is disclosed that is capable of generating electric power based on green technologies (i.e., environmentally friendly) of high performance, low emissions, and low noise. The portable power system consists of three key design features including a free-floating shaft, an electric motor assisted airblast injector and four concentric channel flows. The engine is partitioned into separate channels or passages for the compressed air, hot gases, recuperation, and the engine case and are organized into four concentric channels for portable design and easy maintenance considerations. The concentric channel design also facilitates fully developed flow in each channel for reduction of vibration and noise. The four concentric channels include turbine concentric channel, compressor concentric channel, recuperator concentric channel and engine case concentric channel. Two-way bypass rings are used for cross flows among these concentric channel flows.

9 Claims, 6 Drawing Sheets

PORTABLE GREEN POWER SYSTEMS

BACKGROUND OF THE INVENTION

1. Field of the Invention

The present invention relates in general to gas turbine engines. More particularly, the invention is directed to portable gas turbine engines.

2. Description of the Related Art

Gas turbine engines exhibit high power output and high thermal efficiency and are commonly employed to propel aircraft, generate electrical power, and power ships and trucks. However, most conventional gas turbine engines are not portable as they are typically heavy, costly, and require complex and costly lubrication systems.

Accordingly, a need exists to provide portable, environmentally friendly, gas turbine engines.

SUMMARY OF THE INVENTION

In the first aspect, a turbine engine is disclosed. The turbine engine comprises a turbine, a shaft connected to the turbine, a compressor connected to the turbine by the shaft, a combustor, an exterior housing surrounding the turbine, the compressor, and the combustor, the housing having an air inlet and an exhaust, four concentric channels comprising a turbine concentric channel, a compressor concentric channel, a recuperator concentric channel, and an engine case concentric channel, the turbine concentric channel positioned generally in the center of the housing, the compressor concentric channel positioned immediately surrounding the turbine concentric channel, the recuperator concentric channel positioned immediately surrounding the compressor concentric channel, and an engine case concentric channel positioned immediately surrounding the recuperator concentric channel.

The turbine concentric channel providing a turbine passage positioned generally in the center of the housing, the turbine passage receiving hot gases from the combustor, injecting the hot gases to the turbine, and ejecting the hot gases to the exhaust, and the compressor concentric channel providing a compressor passage positioned immediately adjacent to and partially surrounding the turbine passage, the compressor passage receiving air from the air inlet, directing the air to the compressor, and directing the air to the combustor, the compressor passage in thermal communication with the turbine passage. The recuperator concentric channel providing a recuperator passage adjacent to and surrounding the compressor passage. The recuperator passage configured to provide thermal communication between the compressor passage and the turbine passage. The engine case concentric channel providing an engine case passage surrounding and immediately adjacent to the recuperator passage, the engine case passage configured for thermal communication with the recuperator passage, a first two-way bypass ring connecting the turbine concentric channel with the recuperator concentric channel, and a second two-way bypass ring connecting the compressor concentric channel with the recuperator concentric channel.

In a first preferred embodiment, the four concentric channels are configured to provide a fully developed air/gas flow and containment of the turbine, combustor, and compressor. The turbine engine preferably further comprises an alternator connected to the shaft. The turbine engine preferably further comprises an electric motor assisted airblast injector. The turbine engine preferably further comprises one or more hybrid bearing systems coupled to the shaft. The turbine passage preferably further comprises a stator immediately upstream of the turbine. The compressor passage preferably further comprises a diffuser immediately downstream of the compressor. The shaft is preferably positioned generally horizontally. The shaft is preferably positioned generally vertically.

In a second aspect, a turbine engine is disclosed. The turbine engine comprises a turbine, a shaft connected to the turbine, a compressor connected to the turbine by the shaft, a combustor, an exterior housing surrounding the turbine, the compressor, and the combustor, the housing having an air inlet and an exhaust, a plurality of concentric channels comprising a turbine concentric channel and a compressor concentric channel, the turbine concentric channel positioned generally in the center of the housing, the compressor concentric channel positioned immediately surrounding the turbine concentric channel. the turbine concentric channel providing a turbine passage positioned generally in the center of the housing, the turbine passage receiving hot gases from the combustor, injecting the hot gases to the turbine, and ejecting the hot gases to the exhaust, and the compressor concentric channel providing a compressor passage positioned immediately adjacent to and partially surrounding the turbine passage, the compressor passage receiving air from the air inlet, directing the air to the compressor, and directing the air to the combustor. The compressor passage is in thermal communication with the turbine passage, where the air provides cooling to turbine passage.

In a second preferred embodiment, the turbine engine further comprises an alternator connected to the shaft. The turbine engine preferably further comprises an electric motor assisted airblast injector. The turbine engine preferably further comprises one or more hybrid bearing systems coupled to the shaft. The turbine passage preferably further comprises a stator immediately upstream of the turbine. The compressor passage preferably further comprises a diffuser immediately downstream of the compressor. The shaft is preferably positioned generally horizontally. The shaft is preferably positioned generally vertically.

In a third aspect, a turbine engine is disclosed. The turbine engine comprises a turbine, a shaft connected to the turbine, a compressor connected to the turbine by the shaft, an annular combustor, an exterior housing surrounding the turbine, the compressor, and the combustor, the housing having an air inlet and an exhaust, a plurality of concentric channels comprising a turbine concentric channel and a compressor concentric channel, the turbine concentric channel positioned generally in the center of the housing, the compressor concentric channel positioned immediately surrounding the turbine concentric channel. The turbine concentric channel providing a turbine passage positioned generally in the center of the housing, the turbine passage receiving hot gases from the annular combustor, injecting the hot gases to the turbine, and ejecting the hot gases to the exhaust, and the compressor concentric channel providing a compressor passage positioned generally adjacent to and surrounding the turbine passage, the compressor passage receiving air from the air inlet, directing the air to the compressor, and directing the air to the combustor. The compressor passage is in thermal communication with the turbine passage, wherein the air provides cooling to turbine passage.

In a third preferred embodiment, the turbine engine preferably further comprises an electric motor assisted airblast injector. The turbine engine preferably further comprises one or more hybrid bearing systems coupled to the shaft.

These and other features and advantages of the invention will become more apparent with a description of preferred embodiments in reference to the associated drawings.

DETAILED DESCRIPTION OF THE PREFERRED EMBODIMENTS

Figure 1:
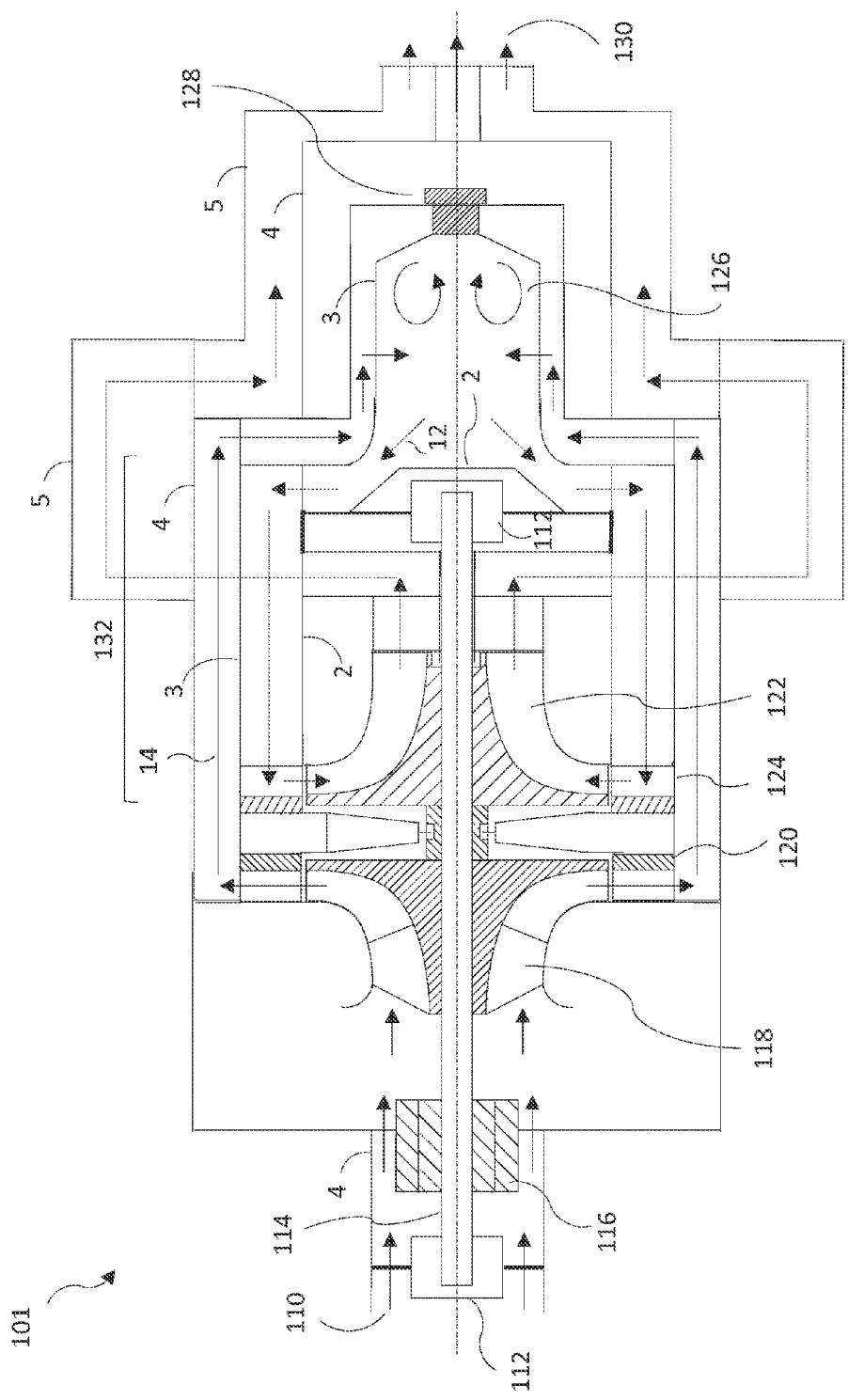
FIG. 1 is a schematic representation of a gas turbine engine in one or more embodiments.

A portable green power system is disclosed that is capable of generating electric power based on green technologies (i.e., environmentally friendly) of high performance, low emissions, and low noise. The portable power system has three key design features including a free-floating shaft, an electric motor assisted airblast injector and four concentric channel flows.

The portable green power system uses a new, free-floating shaft technology to eliminate the use of lubricants and the associated lubrication system without sacrificing ball/roller bearings performance. This design feature significantly reduces engine weight, cost, and part counts. Hence, portable benefits of a power system are achieved. This new free-floating shaft feature also enables both horizontal and vertical engine installations.

The portable green power system also utilizes a new electric motor assisted airblast injector for reliable starting and stable operation at extremely low fuel flow conditions. This new injector produces a fuel/air mixture within flammability limits, which leads to reliable starting and stable operation without any engine problems, including flame-outs, exhaust torching, excessive smoke, and unburned fuels. Therefore, green design goals of low emissions and high performance are easily met in one or more embodiments.

The engine components of engine inlet, compressor, combustor, recuperator, turbine, and engine exhaust are organized into four concentric channels for portable design and easy maintenance considerations. The concentric channel design also facilitates fully developed flow in each channel for reduction of vibration and noise. The four concentric channels include a turbine concentric channel, a compressor concentric channel, a recuperator concentric channel and an engine case concentric channel. Two-way bypass rings are used for cross flows among these concentric channel flows.

For the turbine concentric channel, hot gas from the combustor enters the turbine concentric channel and exits the stator, creating uniform, high velocity gas flow to impinge on the turbine. The turbine concentric channel is located in the innermost area for safety considerations. The turbine concentric channel is used as the first layer of containment for the radial turbine if there is a turbine failure. The turbine concentric channel wall is fully protected by compressor concentric channel air.

For the compressor concentric channel, the pressurized air exiting the compressor/diffuser enters the compressor concentric channel. The channel surrounds the turbine concentric channel and provides cooling for hot section components before the compressed air exits the channel and goes into the combustor uniformly for low noise combustion. For safety considerations, the diffuser is used as the first layer of containment for the compressor, and the compressor concentric channel is used as the second layer of containment for both the radial turbine and the compressor if there is a turbine or compressor failure.

The recuperator concentric channel may be optional, and can be employed for applications requiring higher engine efficiency. If a recuperator concentric channel is employed, the exhaust gas then is allowed to flow through a two-way bypass ring and enter the hot-side channels in the recuperator. After heat loss to the cold-side channel air, the exhaust gas is discharged into the engine case concentric channel. Similarly, the compressed air from the compressor concentric channel enters the cold-side channels in the recuperator. After gaining heat from the hot-side channel gas, the compressed air re-enters the compressor concentric channel around the combustor for injection into the combustor. The recuperator concentric channel provides the third layer of containment for both radial turbine and compressor should there be a turbine or compressor failure.

The engine case concentric channel is the outermost channel in one or more embodiments. The engine case concentric channel is designed to provide insulation by either air gap or eductor cooling. The cooling methods and air temperature for this channel are determined based on application requirements. The engine case concentric channel also provides a fourth layer of containment for both radial turbine and compressor should there be a turbine or compressor failure.

FIG. 1 is a schematic representation of a gas turbine engine 101 in one or more embodiments. The gas turbine engine 101 comprises a turbine 122, a free-floating shaft 114 connected to the turbine 122, hybrid bearings 112, a compressor 118 connected to the turbine 122 by the shaft 114, a turbo-alternator 116, and a combustor 126. In one or more embodiments, the shaft 114 is positioned generally horizontally. The hybrid bearings 112 comprise ball/roller bearings as well as air bearings configured to provide lift to the free-floating shaft 114 during operation for horizontal applications.

The gas turbine 101 has an exterior housing formed by liners 4 and 5 surrounding the turbine 122, the compressor 118, and the combustor 126, the housing 4 having an air inlet 110 and an exhaust 130. The gas turbine engine 101 has an internal network of liners, walls, and cavities for directing air and hot gas flow. Liner 2 is an innermost liner surrounding the free-floating shaft 114, the hybrid bearings 112, and the turbine 122. Liner 3 surrounds liner 2 and provides a turbine passage 12. Liner 4 surrounds liner 3 and provides a compressor passage 14. Liner 5 surrounds a portion of liner 4 and provides an exhaust for the turbine passage.

In one or more embodiments, the gas turbine 101 has a turbine passage 12 positioned generally in the center of the housing 4, the turbine passage 12 receiving the hot gases from the combustor 126, injecting the hot gases to the turbine 122, and ejecting the hot gases to the exhaust 130. In one or more embodiments, the turbine passage 12 further comprises a stator 124 immediately upstream of the turbine.

The hot gas from combustor 126 enters the turbine passage 12 and exits the stator 124 for creating uniform, high velocity gas to impinge on the turbine 122. The turbine passage 12 is located in the innermost area for safety considerations. The turbine passage 12 is used as the first layer of containment for the radial turbine 122 should there be a turbine failure. The turbine passage 12 is fully protected by compressor passage 14 via liner 3.

The gas turbine engine 101 has a compressor passage 14 positioned generally adjacent to and partially surrounding the turbine passage 12, the compressor passage 14 receiving air from the air inlet 110, directing the air to the compressor 118, and directing the air to the combustor 126. In one or more embodiments, the compressor passage 14 further comprises a diffuser 120 immediately downstream of the compressor 118. The pressurized air exiting the compressor 118 and diffuser 120 enters the compressor passage 14. The compressor passage 14 surrounds the turbine passage 12 and provides cooling for hot section components before the compressed air exits the compressor passage 14 and goes into the combustor 126 uniformly for low noise combustion. For safety consideration, the diffuser 120 is used as the first layer of containment for compressor 118 and the compressor passage 14 is used as the second layer of containment for both radial turbine 122 and compressor 118 should there be a turbine or compressor failure.

The compressor passage 14 is separated from the turbine passage 12 by liner 3 in this example throughout the region denoted as region 132 in FIG. 1. Within this region, the compressor passage 14 is in thermal communication with turbine passage 12. In other words, as the compressor passage 14 is separated from the turbine passage 12 by liner 3, the air in the compressor passage 14 will serve to cool the components heated by the hot gases in the turbine passage 12.

Teachings related to the hybrid bearings and air bearings disclosed in U.S. patent application Ser. No. 14/741,103 filed Jun. 16, 2015 entitled "FREE-FLOATING SHAFT FOR GAS TURBINE ENGINES" may be employed herein and the disclosure of which is incorporated herein by reference in its entirety. Two hybrid bearings 112 having ball/roller bearings and a new air bearing design support opposite sides of the free-floating shaft 114 in one or more embodiments. Inlet air for air bearings in the free-floating shaft system are pressurized using compressors and enters cavities located at shaft ends. The use of compressors is optional if pressurized air from engine compressors is available for cavity pressurization. These cavities are designed to reduce thrust load based on the cavity air pressure and shaft-end surface area. The cavity air then flows through the air passageways formed by the rotor shaft and an air-circuit sleeve. Each air passageway has a metering slot at the end of the air-circuit sleeve to regulate airflow rate. Therefore, both the gap and the airflow rate of air passageways can be adjusted to create air pressure differential to lift the rotating shaft. The length of the air-circuit sleeve is determined based on lift surface area needed for weightless rotor rotation, which leads to no metal contact between the rolling element and raceways even without using lubricants and the complicated lubrication system. The air exiting the metering slots is also used to remove heat generated in the ball/roller bearings.

There are two types of hybrid bearings in one or more applications. Hybrid bearings for horizontal applications have air bearings which provide a lifting force enabling the free-floating shaft to be suspended. Hybrid bearings for vertical applications do not provide a net lateral force on the shaft. The hybrid bearings for both the vertical and horizontal applications provide air cooling for the ball/roller bearing applications.

Teachings related to the airblast inject disclosed in U.S. patent application Ser. No. 14/696,655 filed Apr. 27, 2015 entitled "ELECTRIC MOTOR ASSISTED AIRBLAST INJECTOR" may be employed herein and the disclosure of which is incorporated herein by reference in its entirety. The motor-assisted airblast injector assembly consists of an airblast injector, a high speed electric motor and a compressor. The motor assisted airblast injector is designed to improve engine light-off/starting reliability without using pressure injectors. A high speed electric motor is activated during starting to drive a compressor for locally producing pressurized air without sacrificing combustor performance. The amount of pressurized air through the compressor is also controlled by motor speed to match fuel starting schedule and produce a fuel/air mixture within flammability limits, which leads to reliable starting without any starting problems including flameouts, exhaust torching, excessive smoke and unburned fuels.

After successful completion of engine starting, the high speed electric motor will be cut off and the motor assisted airblast injector becomes a normal airblast injector that uses sufficient air pressure differential available across the combustor, at no load or full load operating conditions, to produce high air velocity for atomizing fuel. High velocity air exiting orifices or vanes of the air swirler installed on the swirler cup penetrate perpendicularly into the thin sheets of fuel spray cone obtained by discharging the fuel through the specially-designed orifices in the fuel swirler. Since the fuel flows at these conditions are higher, the airblast injector also uses sufficient fuel pressure differential available to atomize fuel. Hence, fuel atomization and fuel/air mixing are easily achieved using both air and fuel pressure differentials available at no load or full load operating conditions.

Figure 2:
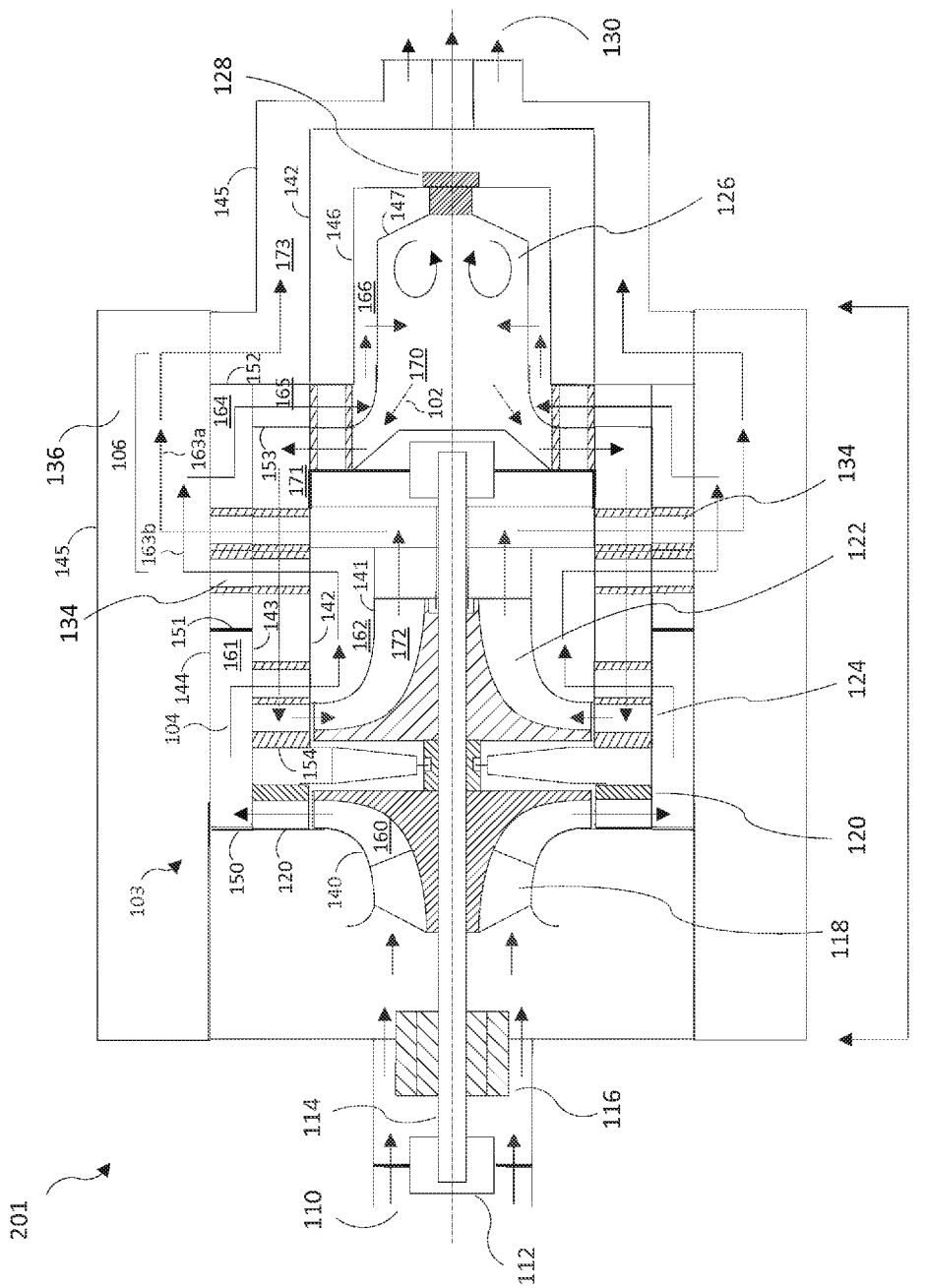
FIG. 2 is a schematic diagram of a gas turbine engine having a recuperator in one or more embodiments.
Figure 3:
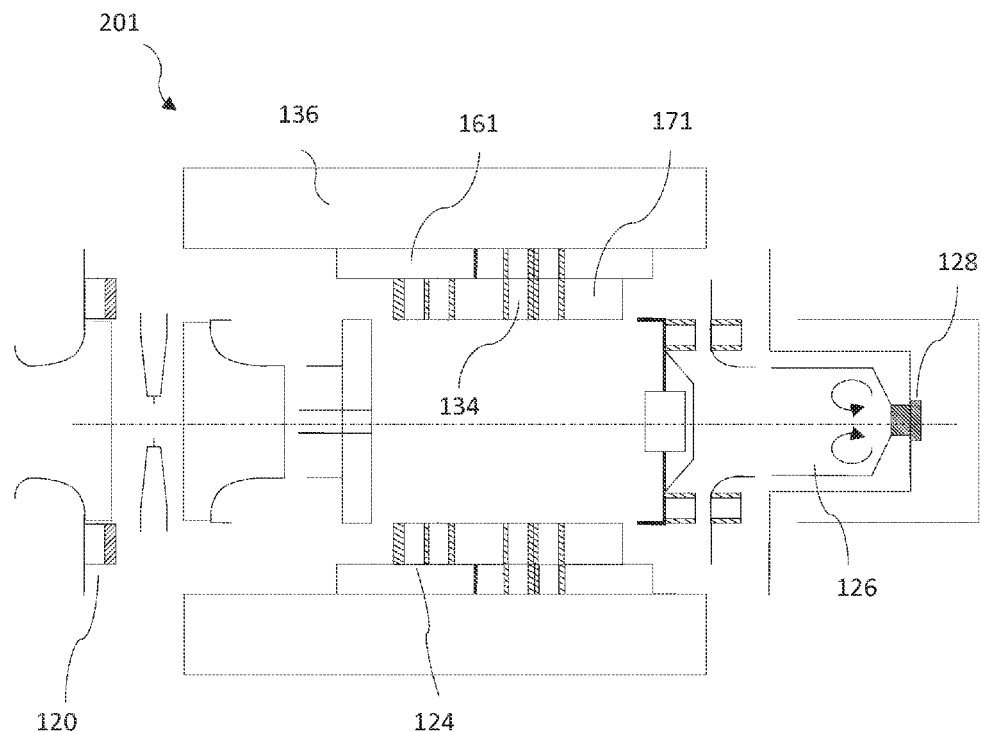
FIG. 3 is an exploded, schematic diagram of a gas turbine engine having a recuperator in one or more embodiments.
Figure 4:
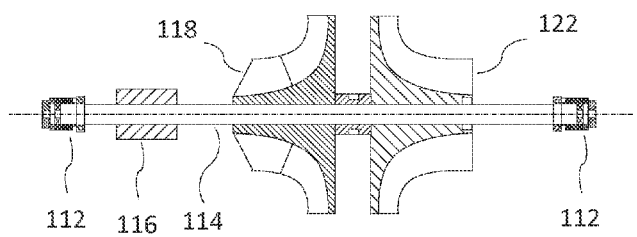
FIG. 4 is a schematic diagram of the free-floating shaft with hybrid bearings in one or more embodiments.

FIGS. 2-4 are schematic diagrams of a gas turbine engine 201 having a recuperator 136 in one or more embodiments. The gas turbine engine 201 comprises a turbine 122, a free-floating shaft 114 connected to the turbine 122, hybrid bearings 112, a compressor 118 connected to the turbine 122 by the shaft 114, a turbo-alternator 116, and a combustor 126. In one or more embodiments, the shaft 114 is positioned generally horizontally. The hybrid bearings 112 comprise ball/roller bearings as well as air bearings configured to provide lift to the free-floating shaft 114 during operation for horizontal applications.

An internal network 103 comprises liners 140-147, walls 150-153, and cavities 160-166, and 170-173 for directing the air and hot gases. The gas turbine engine 201 has a liner 140 surrounding the compressor 118, a liner 141 surrounding the turbine 122, a liner 142 surrounding liner 141, a liner 143 surrounding liner 142, a liner 144 surrounding liner 143, and an exterior housing liner 145 providing a housing for the gas turbine engine 201.

Cavity 160 is formed by liner 140 and compressor 118, cavity 161 is formed between liners 143 and 144 and between walls 150 and 151, cavity 162 is formed between liners 141 and 142, channels 163a and 163b are formed in multiple channels between liners 144 and 145, cavity 164 is formed between liners 143 and 144 and between walls 151 and 152, cavity 165 is formed between liners 142 and 143 and between walls 152 and 153, and cavity 166 is formed by combustor casing liners 146 and combustor liner 147. Recuperator passage 163a receives the hot exhaust gases, and recuperator passage 163b receives the cool compressed air.

In one or more embodiments, both recuperator passages 163a and 163b may each comprise a plurality of channels.

In one or more embodiments, the compressor passage 104 is defined by air traveling serially through cavities 160, the diffuser 120, cavity 161, cavity 162, recuperator path 163b in the recuperator 136, and cavities 164, 165, and 166 where the air is injected into the combustor 126.

Cavity 170 is formed by liner 147, cavity 171 is formed between liners 142 and 143 and between walls 153 and 154, cavity 172 is formed between liner 141 and the turbine 122, and cavity 173 is formed between liners 145 and 142 which serve as an exhaust.

In one or more embodiments, the turbine passage 102 is defined by hot gases exiting the combustor 126, entering into cavities 170 and 171, the stator 124, cavity 172, recuperator path 163a, and cavity 173 where the hot gases exit through the exhaust 130.

In one or more embodiments, the recuperator passage 106 is adjacent to and surrounds the compressor passage 104, the recuperator passage 106 providing thermal communication between the compressed air and the exhaust gases. In one or more embodiments, the recuperator passage 106 is optional and can be added easily for applications requiring higher engine efficiency. If recuperator passage 106 is needed, the exhaust gas then is allowed to flow through a two-way bypass ring 134 and enter the hot-side channels 163a in the recuperator. After heat loss to the cold-side channel 163b air, the exhaust gas is discharged into engine case concentric channel as discussed further below. Similarly, the compressed air from the compressor passage 104 enters the cold-side channels 163b in the recuperator 136. After gaining heat from the hot-side channel gas, the compressed air re-enters the compressor passage 104 around the combustor 126 for injection into combustor 126. The recuperator 136 and recuperator passage 106 provides the third layer of containment for both the radial turbine 122 and the compressor 118 if there is a turbine or compressor failure.

The compressor passage 104 is in thermal communication with the turbine passage 102 such that the compressor passage 104 serves to provide cooling to the turbine passage 102 in at least three separate regions. First, the compressor passage 104 is separated from turbine passage 102 by combustor liner 147, such that heat from the hot gases in the turbine passage 102 may pass through the liner 147, and be released to the air in the compressor passage 104. Second, the compressor passage 104 is separated from turbine passage 102 by liner 143, where the air is flowing through cavity 164 and the hot gases are flowing through cavity 171, such that heat from the hot gases in the turbine passage 102 may pass through the liner 143, and be released to the air in the compressor passage 104. Third, the compressor passage 104 is separated from turbine passage 102 by liner 142, where the air is flowing through cavity 162 and the hot gases are flowing through cavity 172, such that heat from the hot gases in the turbine passage 102 may pass through the liner 142, and be released to the air in the compressor passage 104.

The recuperator passage 106 promotes thermal communication between compressor passage 104 and turbine passage 102. Recuperator passage 163a receives the hot exhaust gas from turbine passage 102 and recuperator passage 163b receives the cool compressed air from the compressor passage 104. The passages 163a and 163b are channels configured to promote thermal communication between the compressor passage 104 and the turbine passage 102 such that heat from the exhaust gases in the turbine passage 102 is transferred to the compressed air in the compressor passage 104.

FIG. 3 is an exploded, schematic diagram of a gas turbine engine 201 having a recuperator in one or more embodiments. FIG. 4 is a schematic diagram of the free-floating shaft with hybrid bearings in one or more embodiments.

Figure 5:
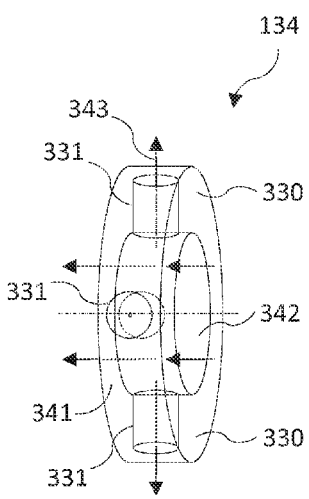
FIG. 5 is a schematic view of the structure of a two-way bypass ring.

FIG. 5 is a schematic view of the structure of a two-way bypass ring 134 having an outer ring wall 341 and an inner ring wall 342 in concentric relation. Two-way bypass ring 134 further comprises a plurality of radial passages 331 that allow recuperator 136 to fluidly communicate with turbine passage 102 or compressor passage 104 as discussed.

Figure 6:
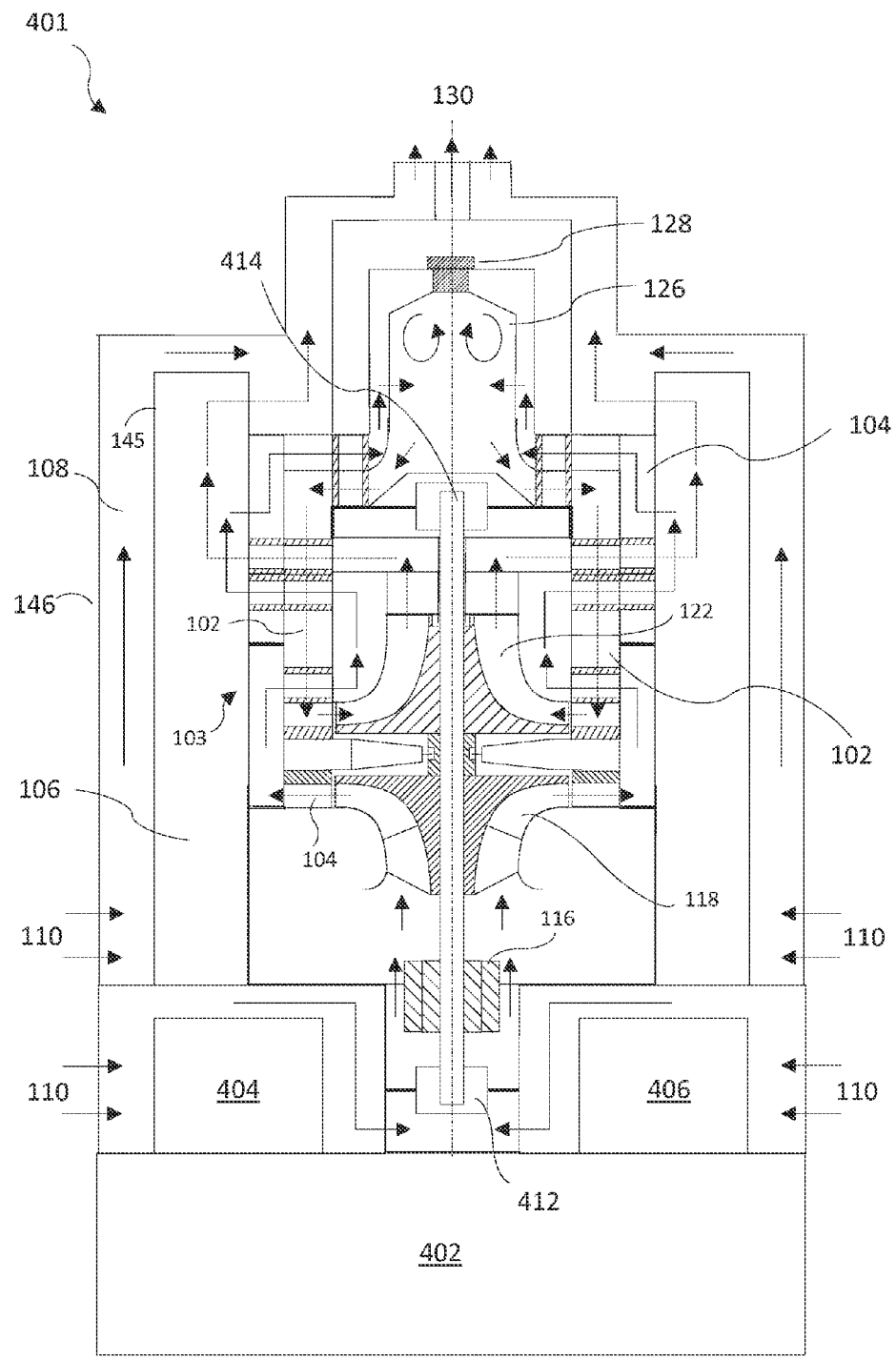
FIG. 6 is a schematic diagram of a vertically oriented gas turbine engine in an embodiment.

FIG. 6 is a schematic diagram of a vertically oriented gas turbine engine 401 in an embodiment. The gas turbine engine 401 comprises a turbine 122, a free-floating shaft 414 connected to the turbine 122, hybrid bearings 412, a compressor 118 connected to the turbine 122 by the shaft 414, a turbo-alternator 116, and a combustor 126. The shaft 414 is positioned generally vertically. The hybrid bearings 412 comprise ball/roller bearings as well as air bearings configured to provide cooling to the ball/roller bearings during operation for vertical applications. The hybrid bearings 412 do not provide for a net lateral force on the free-floating shaft 414, but do provide cooling for the ball/roller bearings in one or more embodiments.

The gas turbine engine 401 has a gasoline tank 402 at the base of the engine 401. The DEC/exciter and fuel pump 404 provides gasoline from the tank 402 to the combustor 126. Power controller and battery 406 provide control and electrical power to the engine 401.

The gas turbine engine 401 has a turbine passage 102, a compressor passage 104, and a recuperator passage 106 formed in the internal network 103 as described above. In addition, gas turbine engine 401 has an engine case passage 108 surrounding and adjacent to the recuperator passage 106, the engine case passage 108 configured for thermal communication with the recuperator passage 106, the compressor passage 104, and the turbine passage 102. The outermost channel is the engine case passage 108. This engine case passage 108 is designed to provide insulation by either air gap or eductor cooling. The cooling methods and air temperature for this engine case passage 108 are determined based on application requirements. The engine case passage 108 also provides the fourth layer of containment for both the radial turbine 122 and compressor 118 should there be a turbine or compressor failure.

The engine case passage 108 is in thermal communication with the recuperator passage 106 such that the engine case passage 108 serves to provide cooling to the recuperator passage 106. The engine case passage 108 is separated from the recuperator passage 106 by liner 145, such that heat from the recuperator passage 106 may pass through the liner 145, and be released to the engine case passage 108.

Figure 7:
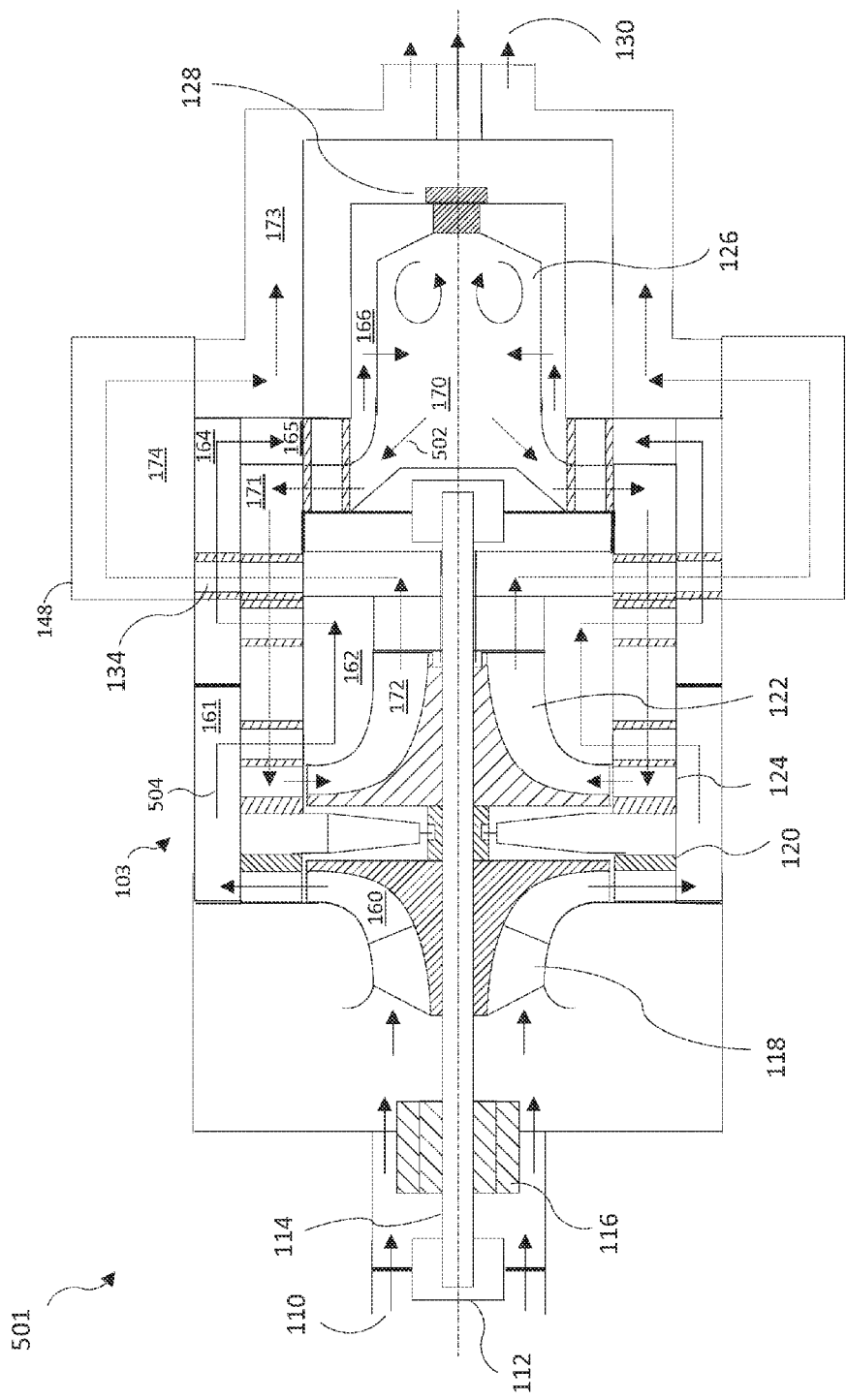
FIG. 7 is a schematic diagram of a gas turbine engine without a recuperator.

FIG. 7 is a schematic diagram of a gas turbine engine 501 without a recuperator. The gas turbine engine 501 comprises a turbine 122, a free-floating shaft 114 connected to the turbine 122, hybrid bearings 112, a compressor 118 connected to the turbine 122 by the shaft 114, a turbo-alternator 116, and a combustor 126. In one or more embodiments, the shaft 114 is positioned generally horizontally. The hybrid bearings 112 comprise ball/roller bearings as well as air bearings configured to provide lift to the free-floating shaft 114 during operation for horizontal applications.

The gas turbine engine 501 has a turbine passage 502, a compressor passage 504, generally formed in the internal network 103 as described above. However, a recuperator passage 106 is not provided. Instead, the turbine passage 502 flows into cavity 174 adjacent to cavity 164 providing cooling to the hot exhaust gases. The hot exhaust gases in the turbine passage 502 then flows out of cavity 174 and to the exhaust 130.

In one or more embodiments, the compressor passage 504 is defined by air traveling serially through cavities 160, the diffuser 120, and cavities 161, 162, 164, 165, and 166 where the air is injected into the combustor 126.

In one or more embodiments, the turbine passage 502 is defined by hot gases exiting the combustor 126, entering into cavities 170, cavity 171, the stator 124, and cavities 172, 174, and 173 where the exhaust gases exit the exhaust 130.

Figure 8:
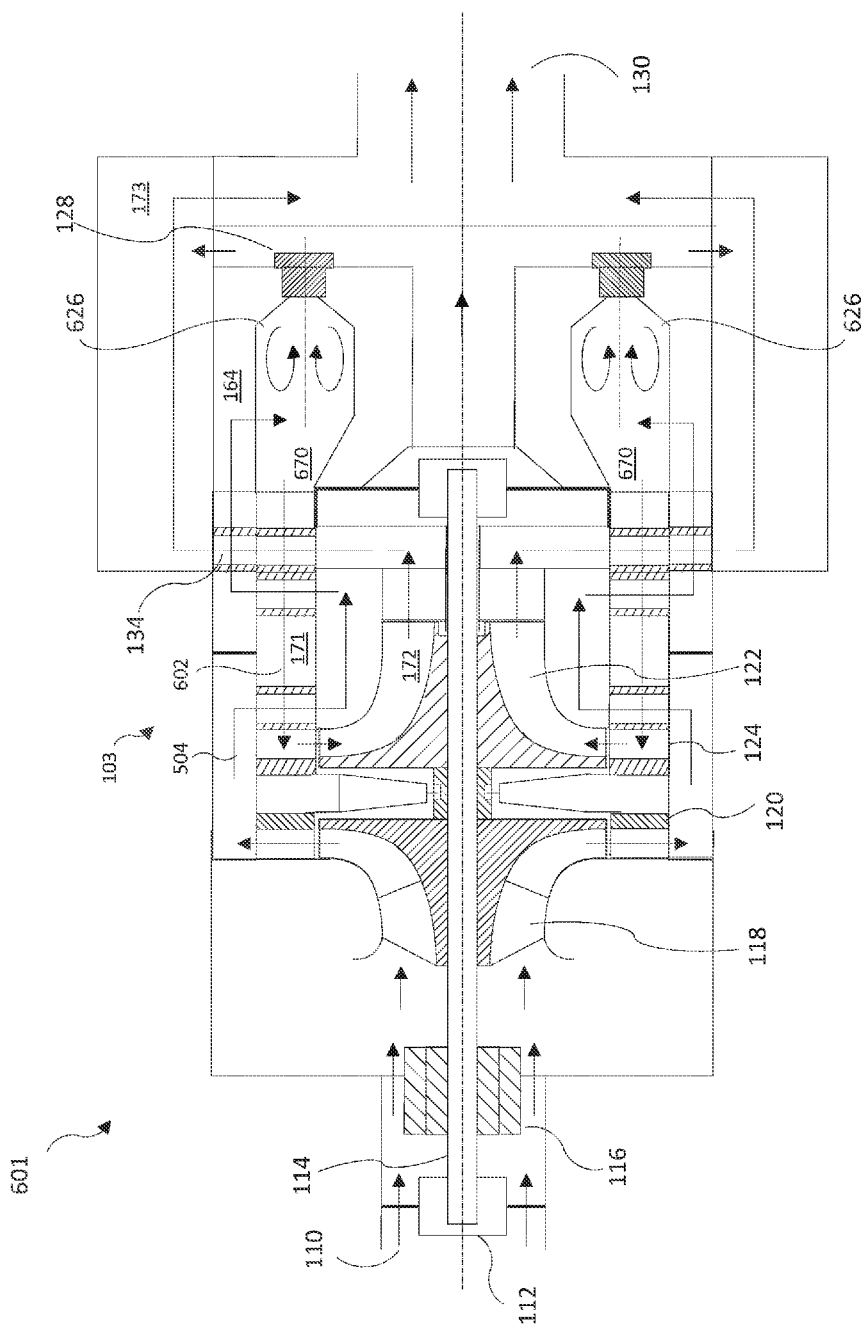
FIG. 8 is a schematic diagram of a gas turbine engine having an annular combustor in an embodiment.

FIG. 8 is a schematic diagram of a gas turbine engine 601 having an annular combustor 626 in an embodiment. The gas turbine engine 601 comprises a turbine 122, a free-floating shaft 114 connected to the turbine 122, hybrid bearings 112, a compressor 118 connected to the turbine 122 by the shaft 114, a turbo-alternator 116, and an annular combustor 626. In one or more embodiments, the shaft 114 is positioned generally horizontally. The hybrid bearings 112 comprise ball/roller bearings as well as air bearings configured to provide lift to the free-floating shaft 114 during operation for horizontal applications.

The gas turbine engine 601 has a turbine passage 602, a compressor passage 504, generally formed in the internal network 103 as described above. However, an annular combustor 626 is provided.

In one or more embodiments, the turbine passage 602 is defined by hot gases exiting the combustor 626, entering into cavities 670, cavity 171, the stator 124, and cavities 172, and 173 where the exhaust gases exit the exhaust 130. Compressor passage 504 is described above.

Although the invention has been discussed with reference to specific embodiments, it is apparent and should be understood that the concept can be otherwise embodied to achieve the advantages discussed. The preferred embodiments above have been described primarily as portable, environmental friendly gas turbines. In this regard, the foregoing description of the portable green power systems is presented for purposes of illustration and description. It shall be apparent that various gas turbine engines may also benefit from the four concentric channels, free-floating shafts, and electric motor assisted airblast injectors discussed herein.

Furthermore, the description is not intended to limit the invention to the form disclosed herein. Accordingly, variants and modifications consistent with the following teachings, skill, and knowledge of the relevant art, are within the scope of the present invention. The embodiments described herein are further intended to explain modes known for practicing the invention disclosed herewith and to enable others skilled in the art to utilize the invention in equivalent, or alternative embodiments and with various modifications considered necessary by the particular application(s) or use(s) of the present invention.

Embodiments described herein illustrate specific examples showing various combinations of features of an engine or system which may include vertical or horizontal hybrid or air bearings, can or annular combustors, horizontal or vertical applications, electric motor assisted airblast injectors, concentric channels, compressor passages, turbine passages, recuperator passages, engine case passages, cavities, liners, walls, internal networks, and/or other geometries. However, it shall be understood that the examples described herein are for illustration purposes, and that other combinations of the features of the engine or system are contemplated in or more embodiments.

In one or more embodiments, the compressor passage, the turbine passage, the recuperator passage, and the engine case passage are physically separated throughout the engine, usually by liners, walls, engine components, and other seals not explicitly described herein. In one or more embodiments, each passage, while physically isolated from other passages, may be in thermal communication with other passages. In other words, heat generated by the combustor, the hot gases, and other components is transferred to the compressor passage, either directly and/or through a recuperator passage, and/or to an engine case passage.

In one or more embodiments, an electric motor assisted airblast injector may comprise an electric motor having a rotating shaft, a compressor coupled to the rotating shaft, and an airblast injector. The airblast injector comprises a fuel swirler generating a fuel spray cone having a spray cone angle, a swirler cup having a plurality of air exiting orifices positioned annually at a swirler location diameter, the air exiting orifices directing air generally perpendicularly into the fuel spray cone, the air exiting orifices having a down angle and a back angle.

In one or more embodiments, a hybrid bearing or air bearing may comprise a shaft centered around a generally horizontal centerline, a compressor coupled to the shaft, the compressor supplying compressed air, and an annular sleeve radially surrounding the shaft, the sleeve having a first and a second set of channels formed on the inner surface of the sleeve, each channel forming an air passageway between the sleeve and the shaft, the first set of channels formed in the generally upper portion of the sleeve, the second set of channels formed in the generally lower portion of the sleeve, the first and second set of channels receiving compressed air from the compressor. The first and second set of channels are configured to generate a lifting force on the shaft in a generally upward direction.

In one or more embodiments, a hybrid bearing or air bearing may comprise a shaft centered around a generally vertical centerline, a compressor coupled to the shaft, the compressor supplying compressed air, and an annular sleeve radially surrounding the shaft, the sleeve having channels formed on the inner surface of the sleeve, each channel forming an air passageway between the sleeve and the shaft, the channels receiving compressed air from the compressor.

What is claimed is:

1. A turbine engine comprising:
   a turbine;
   a shaft connected to the turbine;
   a compressor connected to the turbine by the shaft;
   a combustor;
   an exterior housing surrounding the turbine, the compressor, and the combustor, the housing having an air inlet and an exhaust;
   four concentric channels comprising a turbine concentric channel, a compressor concentric channel, a recuperator concentric channel, and an engine case concentric channel, the turbine concentric channel positioned in the center of the housing, the compressor concentric channel positioned immediately surrounding the turbine concentric channel, the recuperator concentric channel positioned immediately surrounding the compressor concentric channel and the turbine concentric channel, and the engine case concentric channel positioned immediately surrounding the recuperator concentric channel and immediately surrounded by the exterior housing,
   the turbine concentric channel providing a turbine passage receiving hot gases from the combustor, injecting the hot gases to the turbine, providing hot gases through the recuperator concentric channel, and ejecting the hot gases to the exhaust;

the compressor concentric channel providing a compressor passage positioned immediately adjacent to and partially surrounding the turbine passage, the compressor passage receiving air from the air inlet, directing the air to the compressor, providing air through recuperator concentric channel, and directing the air to the combustor, the compressor passage in thermal communication with the turbine passage;

the recuperator concentric channel adjacent to and surrounding the compressor passage and the turbine passage, the recuperator concentric channel accepting portions of the compressor passage and the turbine passage in thermal communication;

the engine case concentric channel providing an engine case passage receiving air from the air inlet and ejecting the air to the exhaust without passing through the compressor, the engine case passage surrounding and immediately adjacent to the recuperator passage, the engine case passage configured for thermal communication with the recuperator passage and the exterior housing;

a first two-way bypass ring connecting the turbine concentric channel with the recuperator concentric channel; and, a second two-way bypass ring connecting the compressor concentric channel with the recuperator concentric channel.

2. The turbine engine of claim 1 wherein the four concentric channels are configured to provide a fully developed air/gas flow and containment of the turbine, combustor, and compressor.

3. The turbine engine of claim 1 further comprising an alternator connected to the shaft.

4. The turbine engine of claim 1 further comprising an electric motor assisted airblast injector.

5. The turbine engine of claim 1 further comprising one or more hybrid bearing systems coupled to the shaft.

6. The turbine engine of claim 1 wherein the turbine passage further comprises a stator immediately upstream of the turbine.

7. The turbine engine of claim 1 wherein the compressor passage further comprising a diffuser immediately downstream of the compressor.

8. The turbine engine of claim 1 wherein the shaft is positioned horizontally.

9. The turbine engine of claim 1 wherein the shaft is positioned vertically.

* * * * *